United States Patent [19]

Yamamoto

[11] Patent Number: 5,353,664
[45] Date of Patent: Oct. 11, 1994

[54] TORSIONAL VIBRATION DAMPING DEVICE

[75] Inventor: Kozo Yamamoto, Neyagawa, Japan

[73] Assignee: Kabushiki Kaisha Daikin Seisakusho, Neyagawa, Japan

[21] Appl. No.: 972,233

[22] Filed: Nov. 5, 1992

[30] Foreign Application Priority Data

Nov. 8, 1991 [JP] Japan .................. 3-292953

[51] Int. Cl.⁵ .............................................. F16F 15/10
[52] U.S. Cl. .................................. 74/573 F; 74/572;
74/574; 464/68; 192/106.2
[58] Field of Search ............... 74/573 F, 574, 572;
192/70.17, 106.1, 106.2; 464/24, 68

[56] References Cited

U.S. PATENT DOCUMENTS

| | | | |
|---|---|---|---|
| 4,739,866 | 4/1988 | Reik et al. | 192/70.17 |
| 4,777,843 | 10/1988 | Bopp | 74/574 |
| 4,903,544 | 2/1990 | Naudin et al. | 74/574 |
| 5,048,658 | 9/1991 | Reik | 74/574 X |
| 5,052,978 | 10/1991 | Hanke | 464/68 X |
| 5,088,964 | 2/1992 | Kuhne | 192/106.2 X |
| 5,097,722 | 3/1992 | Fukushima | 74/574 |
| 5,103,688 | 4/1992 | Kuhne | 74/574 |
| 5,105,680 | 4/1992 | Naudin | 74/574 |
| 5,105,681 | 4/1992 | Naudin et al. | 74/574 |
| 5,119,692 | 6/1992 | Naudin | 74/573 F |
| 5,156,067 | 10/1992 | Umeyama | 74/573 F X |
| 5,168,775 | 12/1992 | Naudin et al. | 464/24 X |
| 5,180,044 | 1/1993 | Fukushima et al. | 74/574 X |
| 5,218,884 | 6/1993 | Röhrle | 464/68 X |

FOREIGN PATENT DOCUMENTS

| | | | |
|---|---|---|---|
| 4-165144 | 6/1992 | Japan | 74/573 F |
| 4-194433 | 7/1992 | Japan | 74/573 F |
| 91/10078 | 7/1991 | PCT Int'l Appl. | 74/573 F |

Primary Examiner—Vinh T. Luong
Attorney, Agent, or Firm—Knobbe, Martens, Olson & Bear

[57] ABSTRACT

In a torsional vibration damping device functioning in a torque transmission comprising an input rotation member, an output member, and drive/driven assemblies, viscous damping is effected in a structurally integral fluid chamber. The damping device includes a hydraulic damper essentially consisting in the viscous-fluid containing fluid chamber as formed by respective surfaces of the input rotation member and of the drive and driven assemblies. Torsional vibration damping is thus provided in the connection of the drive and driven assemblies.

26 Claims, 3 Drawing Sheets

TORSIONAL VIBRATION DAMPING DEVICE

BACKGROUND OF THE INVENTION

The present invention relates to a torsional vibration damping device, and particularly to a torsional vibration damping device which damps torsional vibration through a viscous fluid medium.

It is known in the art to employ a viscous hydraulic damper as the torsional vibration damping device in an automobile.

Such torsional vibration damping devices comprise a drive plate assembly connectable to an engine crankshaft, a driven plate assembly connectable to a transmission input shaft through a clutch, and a viscous hydraulic damper comprising a fluid chamber located between the drive and driven plate assemblies. The fluid chamber is defined by an annular housing located between both plate assemblies, wherein the fluid housing has projecting rims engaged in annular recesses formed in the driven plate assembly so as to seal the fluid chamber.

Power from the engine is transmitted from the drive plate assembly to the driven plate assembly, from which the power is in turn transmitted to the transmission, wherein torsional vibrations are damped by the viscous hydraulic damper. The fluid chamber is thus defined by the fluid housing in the foregoing structure, entailing extra components and complicating the structure.

SUMMARY OF THE INVENTION

It is an object of the present invention to simplify the structure of a torsional vibration damping device.

A torsional vibration damping device according to an aspect of the present invention is employed in a power transmission comprising an input rotation member and an output member rotatably connected to the input rotation member and to which power is transmitted from the input rotation member. The torsional vibration damping device comprises a drive assembly, a driven element and a viscous hydraulic damper.

The drive assembly is a pair of plates connected to the input rotation member. The driven element is connected to the output member. The viscous hydraulic damper consists in a fluid chamber defined by the input rotation member, the drive assembly and the driven element, and damps torsional vibration, arising when the drive assembly and the driven element twist relative to each other, by agency of a viscous fluid in the fluid chamber.

The fluid chamber of the viscous hydraulic damper is defined by the drive assembly and the driven element, and the input rotation member, such that additional fluid chamber-specific components such as a fluid housing are unnecessary, thereby simplifying overall construction.

The foregoing and other objects and advantages of the present invention will become more apparent from the following detailed description, with reference to the accompanying drawings.

DESCRIPTION OF THE PREFERRED EMBODIMENT

Figure 1:
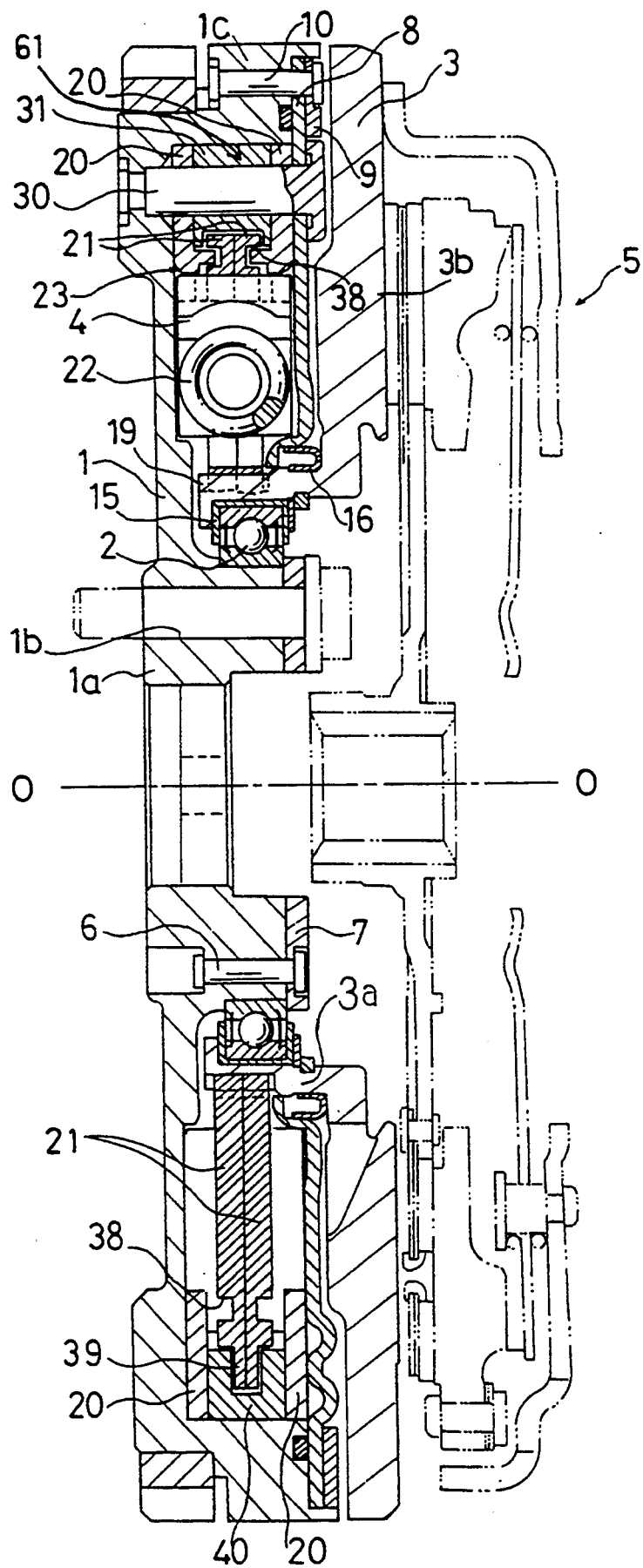
FIG. 1 is a split-open sectional view of a power transmission device to which the present invention is applied, taken through the lines I—I of FIG. 2.

FIG. 1 shows a power transmission device in an embodiment according to the present invention.

The power transmission device comprises a first flywheel 1, a second flywheel 3 rotatably supported by the first flywheel 1 through a bearing 2, and a viscous fluid damping mechanism 4 (herein after referred to more briefly as damping mechanism 4) disposed between the first flywheel 1 and the second flywheel 3. The first flywheel 1 is fixed to the crankshaft (not shown) end of a motor vehicle engine. A clutch 5 is mountable on the second flywheel 3.

The first flywheel 1 is a composite disc having a central hub 1a extending toward the second flywheel 3 and a flywheel portion 1c formed as a rim integral around the periphery of the disc portion, so as to define between itself and the central hub 1a an annular recess for containing the damping mechanism 4. The bearing 2 is installed circumventing the crown of the hub 1a, and is retained by a plate 7 fixed to the end surface of the hub 1a crown by rivets 6. The hub 1a is perforated by holes 1b through each of which a bolt (indicated by phantom lines) penetrates to fasten the power transmission device to the crankshaft. Fixed to the end of the flywheel portion 1c of the first flywheel 1 toward the second flywheel 3 are a stop plate 8 and a subplate 9 for retaining the damping mechanism 4 within the first flywheel 1.

The second flywheel 3 is a composite disc having a central hub 3a extending toward the first flywheel 1 and its inner surface is supported on the bearing 2. The bearing 2 seals lubricant therein and is partly encapsulated by an annular insulation member 15 between itself and the inner surface of the hub 3a, for insulating heat from the clutch 5. The insulation member 15 is in contact with the bearing 2 only on its outer race, short of contacting its inner race. Formed adjacent the crown of the hub 3a are, as shown FIG. 2, wave-like teeth 19 with which an output portion of the damping mechanism 4 is engaged. Around the base of the hub 3a, a seal member 16 is disposed, between the hub 3a and a radially inward portion of the stop plate 8, in order to seal the damping fluid with in the damping mechanism 4. The surface of the second flywheel 3 on the clutch-ward side is a friction surface 3b onto which the friction material facing of a clutch disc presses.

Next, the damping mechanism 4 will be described.

The damping mechanism 4 includes a pair of mutually opposed drive plates 20, a pair of driven plates 21 disposed between the drive plates 20, and torsion springs 22 elastically interconnecting the drive and the driven plates, which plates further contain and define a viscous hydraulic damper 23 for damping torsional vibrations through the agency of viscous fluid.

Figure 3:
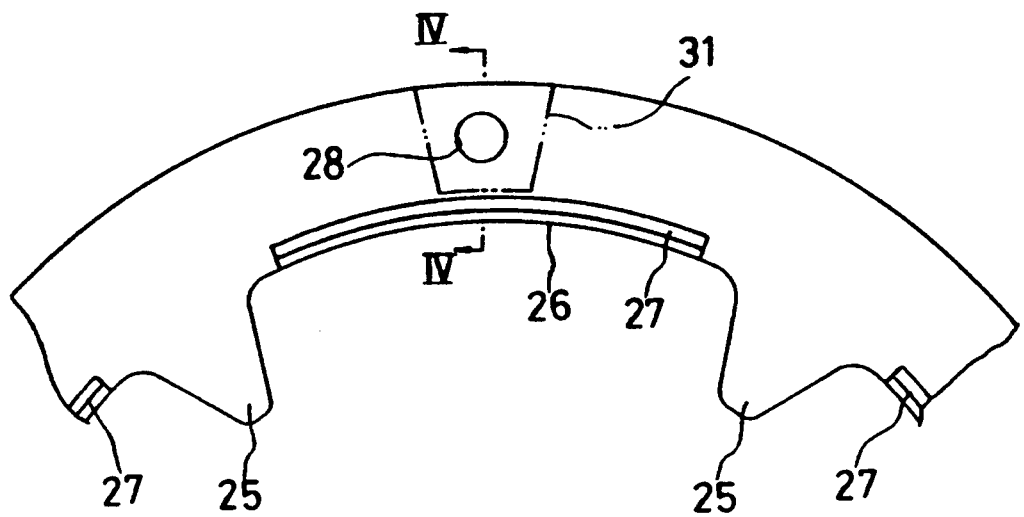
FIG. 3 is a partial lateral view of a drive plate.
Figure 4:
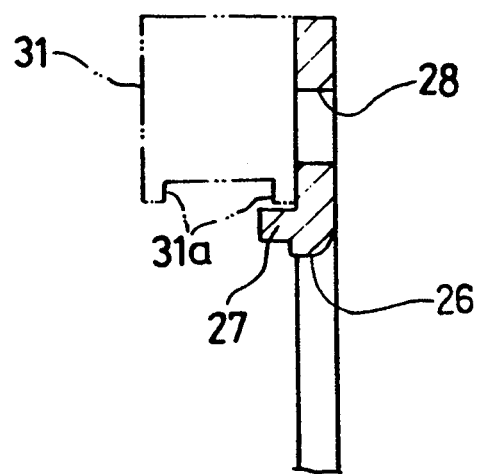
FIG. 4 is a partial view taken through line IV—IV of FIG. 3.

The drive plates 20 are a pair of annular members having radially inward projecting portions 25, as shown in FIG. 3, at given sectoral intervals. Adjacent projecting portions 25 define a space 26 therebetween for containing a torsion spring 22. The radially inward edge between the projecting portions 25 of each drive plate 20 is bent at angle, as shown in FIG. 4, forming an annular projection 27. Formed midway between adjacent projecting portions 25 of the drive plates 20 are respective holes 28, penetrated by fixing pins 30, each mounting a tab 31 sandwiched between the pair of the drive plates 20 thus fixed together with the stop plate 8.

Each tab 31 has along its radially inward end, as shown in FIG. 4, axially opposed spline portions 31a.

Figure 2:
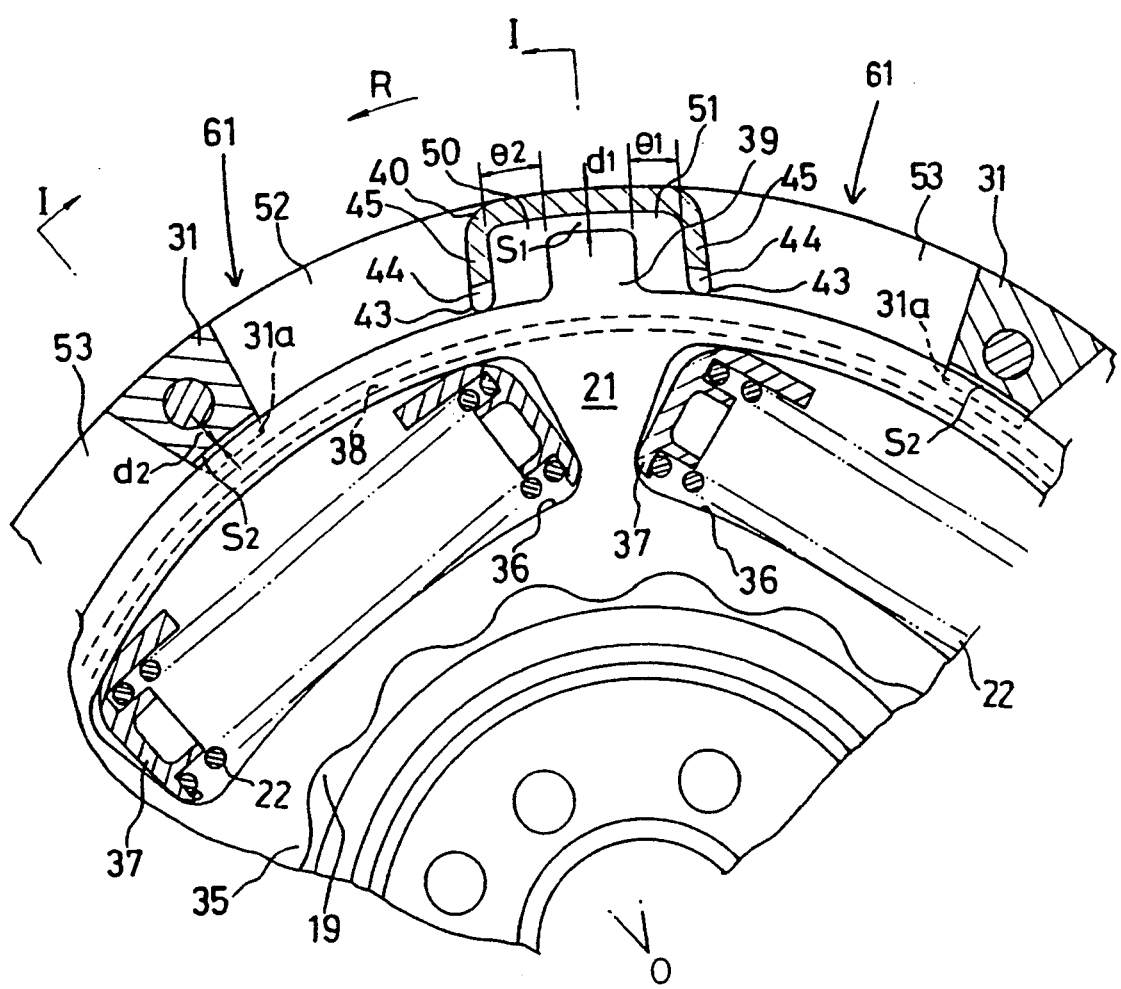
FIG. 2 is a partial view cross-sectional to FIG. 1.

Annular driven plates 21 have, as shown in FIG. 2, complementary wave-like teeth 35 which engage with the wave-like teeth 19 formed adjacent the crown of the hub 3a of the second flywheel 3. This engagement makes it possible for the driven plates 21 and the second flywheel 3 to rotate integrally. The driven plates 21 have a plurality of apertures 36 in circumferential correspondence with the spaces 26 of the drive plates 20. Circumferentially compressive torsion springs 22 are disposed in the apertures 36. The torsion springs 22 abut against, as FIG. 2 shows, the circumferentially opposing walls of the apertures 36, as well as against corresponding adjacent projections 25, through spring seats 37. When the damping mechanism 4 is not activated, only the radially inward ends of the spring seats 37 abut against the circumferentially opposing walls of the apertures 36 and the projections 25. That is, the ends of the torsion springs 22 thus contained in the apertures 36 are situated on a bias with respect to the projections 25 and the coincident walls of the apertures 36.

Annular grooves 38 are formed along the periphery of each driven plate 21 opening axially opposed, wherein the annular projections 27 of the drive plates 20 engage with the grooves 38. A plurality of projections 39 are formed extending radially outward from that portion of the periphery of the driven plates 21 between adjacent apertures 36.

The viscous hydraulic damper 23 includes a fluid chamber 61 defined by the pair of the drive plates 20, the driven plates 21 and the first flywheel 1; the plurality of tabs 31 disposed within the fluid chamber 61 at given spacings; and a plurality of sliders 40 circumferentially slidable within the fluid chamber 61. The fluid chamber 61 is formed as follows: the pair of the drive plates 20 defines its lateral walls; the flywheel portion 1c of the first flywheel 1 defines its radially outer wall; and the driven plates 21 define its radially inner wall. The fluid chamber 61 is sealed at its radially inward portion by the engagement of the annular projections 27 of the drive plates 20 and the annular grooves 38 of the driven plates 21. The tabs 31 are prevented from moving axially since their spline portions 31a laterally flank the periphery of the driven plates 21.

Each slider 40 is formed as a cap which opens radially inward, and its radially outer wall is arched to conform to the inner surface of the adjacent inner wall of the flywheel portion 1c of the first flywheel 1. Fluid passages 44 are formed in the circumferentially opposed walls of the slider 40 at their radially inward ends. The circumferentially opposed walls of each slider 40 serve as stops 45, which will be circumferentially spaced apart from the projection 39 by, for example, angles of θ1 and θ2, respectively, when the engine is at rest. The projection 39 divides the space interior of the slider 40 into a first subcompartment 50 in its forward portion, and a second subcompartment 51 in its rear portion, with respect to the direction of rotation R; and forms a subchoke S1, whereby the subcompartments 50, and 51 communicate along the inner surface of the slider 40.

Main chokes S2, by which adjacent compartments 52, and 53 of the fluid chamber 61 communicate, are formed between the concave inner surface of the tab 31 and the peripheral composite edge of the driven plates 21. The clearance d2 of each main choke S2 is smaller than the clearance d1 of the subchokes S1. In other words, the flow-sectional area of a subchoke S1 is greater than that of a main choke S2.

In the above-explained structure, the fluid chamber 61 is formed as between the pair of the drive plates 20 and is sealed by the engagement of the annular projections 27 and the annular grooves 38. Consequently, no additional structural elements are needed to establish the fluid chamber, thus simplifying the overall structure of the power transmission device.

The tabs 31 are of single-piece construction such that resin-forming is facilitated. The drive plates 20 are of simple shape, such that they can be stamped out. The structural simplicity improves sealing within the fluid chamber and stabilizes the viscosity of the fluid therein. Furthermore, since the power-transmitting drive plates 20 also serve to compose the fluid chamber, the overall volume of the fluid chamber is greater than a fluid chamber formed by, for example, a separate fluid housing, thus providing increased viscosity.

Description will now be made of the operation of the power transmission device.

When torsional vibration developing during operation is transmitted to this power transmission device, the drive plates 20 rotate clockwise or counterclockwise relative to the driven plates 21. Initially, under small-angle torsion, the torsion springs 22 are compressed until their partially contacting ends just meet the corresponding adjacent walls of apertures 36 or the projections 25, through which stage the viscous damping mechanism 4 provides low-torsion rigidity. As the angle of torsion increases, the torsion springs 22 are further compressed, with their ends fully abutting the corresponding end faces of the apertures 36 or the projections 25, after which stage the viscous damping mechanism 4 provides high-torsion rigidity.

The following is a description of the generation of hysteresis torque due to the flow of fluid in the viscous damping mechanism 4 caused by changes in torsional torque.

Given the state wherein the projection 39 is not abutting against either of the stops 45 of the slider 40, and that the drive plate 20 rotates in, for example, the direction R relative to the driven plates 21, then the slider 40 will move in union in the direction R. Consequently, the second subcompartment 51 is compressed, decreasing in volume, and at the same time the first subcompartment 50 is expanded, increasing in volume. As a result, fluid flows mainly from the second subcompartment 51 into the first subcompartment 50 through the subchoke S1. In this instance, since the flow-sectional area of subchokes S1 is large, the resistance of the passage is small. Consequently, the hysteresis torque generated is low. Moreover, since as above-mentioned the accuracy of the sealing between the driven plates 21 and the drive plates 20 is improved, fluid viscosity is therein stabilized.

Wherein the torsional angle is so great that the stop 45 of the trailing-end wall of the slider 40 with respect to the direction R contacts the projection 39, the subchoke S1 is closed off and the slider 40 is pressed against the projection 39, i.e., the slider 40 moves in conjunction with the projection 39. The drive plates 20 move forward of the direction R relative to the driven plates 21 and the sliders 40. Consequently, fluid in each compartment 53 flows reverse to the direction R into that compartment 52 succeeding it through the main choke S2, and also flows forward in the direction R into that compartment 52 proceeding it through a gap between the outer surface of the slider 40 and the flywheel portion 1b of the first flywheel. In this instance, since the flow-sectional area of the main chokes S2 is small, high fluid resistance thereby obtains. Consequently, the hysteresis torque generated is high. Herein as well stabilized fluid viscosity obtains, as likewise during small torsional torque, owing to the improved sealing performance.

Increasingly high torsional angles expand the compartment 52 as described before, and fluid leaked out of the fluid chamber 61 returns into the slider 40 and the second compartment 52 by passing between the interannular projection 27 gaps along the drive plates 20, and the driven plates 21.

Other Embodiments

The annular projections 27 are made by bending radially inward portions of the drive plates 20 in the aforementioned embodiment, in order to provide engagement with the annular grooves 38 of the driven plates 21. The present invention, however, can be otherwise embodied. For example, an annular rubber element attached to the flat of each drive plate functions as the projections 27 do.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A torsional vibration damping device for use in a power transmission including an input rotation member and an output member rotatably connected to said input rotation member and to which power is transmitted from said input rotation member, comprising:

a pair of drive plates connectable to said input rotation member, said pair of drive plates being situated so as to contain a space therebetween, and including engagement projections extending toward each other;

a driven element connectable with said output member, said driven element being located between said drive plates and being recessed for engagement with said engagement projections in order to seal said fluid chamber; and a damping means including a fluid chamber formed by said input rotation member, said drive plates, and said driven element, for damping torsional vibration through fluid in said fluid chamber in response to twisting of said drive plates and said driven element relative to each other.

2. A torsional vibration damping device according to claim 1, wherein said fluid chamber is annular; and said drive plates form lateral walls of said fluid chamber, said driven element forms a radially inward wall of said fluid chamber, and said input rotation member forms a radially outer wall of said fluid chamber.

3. A torsional vibration damping device according to claim 2, wherein said damping means includes a plurality of tab members segmenting said fluid chamber and defining first chokes between themselves and one of said walls of said fluid chamber.

4. A torsional vibration damping device according to claim 3, wherein said tab members are disposed between and fixed to said pair of drive plates so that rotation thereof is in union.

5. A torsional vibration damping device according to claim 4, wherein said damping means includes pins penetrating said tab members and fixed to said pair of drive plates.

6. A torsional vibration damping device according to claim 5, wherein said tab members are manufactured of a synthetic resin.

7. A torsional vibration damping device according to claim 3, wherein said damping means comprises choke projections, in circumferentially peripheral extension from said driven element, which project into said fluid chamber between adjacent pairs of said choke tabs, and a slider slidably disposed in said fluid chamber and covering said choke projections such that second chokes are formed between each of said sliders and said choke projections.

8. A torsional vibration damping device according to claim 7, wherein a flow-sectional area of each of said first chokes is smaller that of said second chokes.

9. A torsional vibration damping device according to claim 8, wherein said input rotation member includes a rim forming said radially outer wall of said fluid chamber; and said slider is a cap opening radially inward, a radially outward wall of which is arched so as to conform to an interior surface of said rim, said slider having openings in radially inward portions of circumferentially opposed walls thereof, which openings are closed off when said slider comes into circumferentially sliding contact with said choke projection.

10. A torsional vibration damping device according to claim 1, wherein said engagement projections are formed in arcs along an inner circumferential edge of said drive plates, and interstices between said engagement projections function as passages allowing return flow of fluid into said fluid chamber.

11. A torsional vibration damping device according to claim 1, wherein said engagement projections are integral with said drive plates.

12. A torsional vibration damping device according to claim 1, further comprising an elastic connection mechanism for connecting said drive plates with said driven element in circumferentially elastic coupling.

13. A torsional vibration damping device according to claim 12, wherein said elastic connection mechanism includes apertures extending circumferentially in said driven element; an elastic member contained in each of said apertures; and inner projections extending radially inward from said drive plates and abutting either end of each of said elastic members.

14. A torsional vibration damping device according to claim 13, wherein said elastic members is a coil spring, of which ends abut on circumferentially opposed walls of said aperture at a bias when said drive plates and said driven element are not twisted relative to each other.

15. A torsional vibration damping device for use in a power transmission including an input rotation member and an output member rotatably connected to said input rotation member and to which power is transmitted from said input rotation member, comprising:

a pair of drive plates connectable to said input rotation member, said pair of drive plates being situated so as to contain a space therebetween, and including engagement projections extending toward each other;

a driven element connectable with said output member, said driven element being located between said drive plates and being recessed for engagement with said engagement projections in order to seal said fluid chamber;

a damping means including a fluid chamber formed by said input rotation member, said drive plates, and said driven element, for damping torsional vibration through fluid in said fluid chamber in response to twisting of said drive plates and said driven element relative to each other; and an elastic connection mechanism for connecting said drive plates with said driven element in circumferentially elastic coupling, said elastic connection mechanism including apertures extending circumferentially in said driven element, an elastic member contained in each of said apertures, and inner projections extending radially inward from said drive plates and abutting either end of each of said elastic members.

16. A torsional vibration damping device according to claim 15, wherein said fluid chamber is annular;

said drive plates form lateral walls of said fluid chamber, said driven element forms a radially inward wall of said fluid chamber, and said input rotation member forms a radially outer wall of said fluid chamber.

17. A torsional vibration damping device according to claim 16, wherein said damping means includes a plurality of tab members segmenting said fluid chamber and defining first chokes between themselves and one of said walls of said fluid chamber.

18. A torsional vibration damping device according to claim 17, wherein said tab members are disposed between and fixed to said pair of drive plates so that rotation thereof is in union.

19. A power transmission device, comprising:
a first flywheel connectable to an engine-ward rotation member, said first flywheel includes a rim forming an axially recessed annular cavity in which said damping means is contained;
a second flywheel rotatably supported by said first flywheel and connectable to an output member;
a pair of drive plates connected to said first flywheel, said pair of drive plates being situated so as to contain a space therebetween, and including engagement projections extending toward each other;
a driven element connected to said second flywheel, said driven element being located between said drive plates and being recessed for engagement with said engagement projections in order to seal said fluid chamber;
a damping means including a fluid chamber formed by said input rotation member, said drive plates, and said driven element, for damping torsional vibration through fluid in said fluid chamber in response to twisting of said drive plates and said driven element relative to each other.

20. A power transmission device according to claim 19, wherein said fluid chamber is annular; and
said drive plates form lateral walls of said fluid chamber, said driven element forms a radially inward wall of said fluid chamber, and said input rotation member forms a radially outer wall of said fluid chamber.

21. A power transmission device according to claim 20, wherein said engagement projections are integral with said drive plates.

22. A power transmission device according to claim 21, wherein said damping means includes a plurality of tab members segmenting said fluid chamber and defining first chokes between themselves and one of said walls of said fluid chamber.

23. A power transmission device according to claim 21, wherein said tab members are disposed between and fixed to said pair of drive plates so that rotation thereof is in union.

24. A power transmission device according to claim 19, further comprising an elastic connection mechanism for connecting said drive plates with said driven element in circumferentially elastic coupling.

25. A power transmission device according to claim 24, wherein said elastic connection mechanism includes apertures extending circumferentially in said driven element; an elastic member contained in each of said apertures; and inner projections extending radially inward from said drive plates and abutting either end of each of said elastic members.

26. A power transmission device according to claim 25, wherein said elastic members is a coil spring, of which ends abut on circumferentially opposed walls of said aperture at a bias wherein said drive plates and said driven element are not twisted relative to each other.

* * * * *